May 20, 1952  W. E. KERR  2,597,499
MEANS FOR DRAWING TUBES
Filed June 8, 1943  8 Sheets-Sheet 3

INVENTOR.
Wallace E. Kerr.
BY

May 20, 1952 W. E. KERR 2,597,499
MEANS FOR DRAWING TUBES
Filed June 8, 1943 8 Sheets-Sheet 5

INVENTOR
Wallace E. Kerr.
BY
Francis J. Klempay
ATTORNEY

May 20, 1952 — W. E. KERR — 2,597,499
MEANS FOR DRAWING TUBES
Filed June 8, 1943 — 8 Sheets-Sheet 6

INVENTOR
Wallace E. Kerr.
BY
Francis G. Klempay
ATTORNEY

May 20, 1952 W. E. KERR 2,597,499
MEANS FOR DRAWING TUBES
Filed June 8, 1943 8 Sheets-Sheet 7

INVENTOR
Wallace E. Kerr.
BY
Francis J. Klempay
ATTORNEY

May 20, 1952 W. E. KERR 2,597,499
MEANS FOR DRAWING TUBES
Filed June 8, 1943 8 Sheets-Sheet 8

INVENTOR
Wallace E. Kerr.
BY Francis J. Klempay
ATTORNEY

UNITED STATES PATENT OFFICE 2,597,499

MEANS FOR DRAWING TUBES

Wallace E. Kerr, Youngstown, Ohio

Application June 8, 1943, Serial No. 490,060

7 Claims. (Cl. 205—4)

This invention relates to method and apparatus for drawing metal tubes and more particularly to improved methods for starting the drawing operations and to improved devices for initiating the respective drawing operations and thereafter completing the same. A source of particular difficulty in the drawing of metal shapes through a die or other metal working device is the providing for the placing of an integral portion of the blank beyond the die or device where it may be grasped by suitable tongs or grippers to effect the completion of the drawing operation. In drawing rods and bars the necessary step of starting the stock through the die or other working device can be satisfactorily provided for by grasping the stock piece ahead of the working station by a mechanism commonly termed a "push pointer" which is operative to forcibly project the end of the work piece through the station. The reduced and projecting end, being solid, may be readily grasped by the grippers on the drawbench buggy and in this manner successive drawings may be rapidly accomplished with attendant economy in the production of the shapes.

Tube blanks cannot normally be processed in the manner described above for rods and bars since push-pointers as now constructed are not satisfactorily operative for extruding the end of the blank through the die or other working device and since the extruded end of the blank, being hollow, collapses upon application of lateral pressure from the grippers on the drawbench and disengages itself from the grippers. It is an object of the invention to provide a push pointing mechanism of improved design which is operative to extrude the leading end of the tube blank through a drawing die without collapsing the blank and without otherwise causing irreparable damage to the same. Another object is to provide an improved tube end gripping assembly which may be readily carried on the drawbench buggy and which is operative to tightly grip the end of the tube regardless of the physical character of the tube and its side wall thickness. In this manner tube blanks to be drawn are expeditiously processed and substantial economies in the operation of the plant may be effected. This particular method is operative either for sinking or in conjunction with the conventional plug mandrel for reducing the side wall thickness although it will be understood that according to this method the short advancing end portion of the tube will not be reduced as to side wall thickness. The invention, however, as will appear more fully below, enables the length of this portion to be quite short thereby reducing cropping loss substantially. Other advantages will be pointed out below.

Heretofore, in preparing tube blanks for drawing the practice has been to swage down the end portion of the blank to a size which allows it to pass readily through the die and if the draw is to be merely a sinking operation or a reducing pass employing a plug mandrel the rolled down end portion of the blank is engaged directly on opposite sides by the grippers on the drawbench buggy. Such preparing of the tube blank requires a separate operation and additional handling and in addition to the substantial scrap loss because of the material length of the swaged down end, the partial closing of the opening through the tube is objectionable in subsequent pickling operations. The end opening may be further reduced by the action of the grippers and in certain instances the restriction may be such that holes are punched in the side walls of the tubes adjacent their pointed ends to allow the acid to circulate through the tubes in the pickling process. As is well understood, the production of many tubes requires successive drawing operations and it is necessary to anneal, pickle, and re-lubricate the blanks between successive drawings. By the applicant's methods no preliminary pointing of the blanks is required and at the end of each drawing operation the tubes are left open at both ends whereby the intermediate or subsequent treating of the tubes is facilitated.

In accordance with the methods of the invention a long shouldered drawing mandrel may be employed, if desired, and in this mode of operation the push-pointer of the invention is operative to sink the end portion of the tube blank down onto the reduced end of the mandrel and to extrude the same through the die to a position where it may be engaged by the grippers on the drawbench buggy. In this case the collapsing of the tube end is prevented by the solid nature of the reduced end of the mandrel. I am aware that it is known to insert separable plugs in the ends of tubes to prevent the collapsing thereof by the grip bits of the drawing machine and I make no claim to methods evolving about the use of these separable elements.

In the methods described above an end portion of each of the tube blanks cannot be reduced as to side wall thickness but a further object of the invention is the provision of a process whereby a tube blank of more or less uniform cross section may be reduced as to side wall thickness throughout its entire length with little or no scrap loss and with but little damage to the tube which damage may be readily removed before the next succeeding drawing operation. The nature of the metal and blank and the character of the working operation may be such that the operation of the push-pointer itself is effective to force the blank, which is mounted on a mandrel of uniform cross section, through the die a sufficient extent to be engaged by the drawbench grippers. For more difficult drawing operations the end of the uniform mandrel which projects through the die may be engaged and pulled by a suitable pulling mechanism while the push-pointer pushes the mandrel and stock through the die. Upon the blank end being extruded a sufficient distance to be engaged by the grippers or tongs on the drawbench buggy the latter is applied and utilized to complete the draw. In this manner the entire length of the blank is worked and the resultant product is entirely of uniform cross section.

Yet another object of the invention is the provision of an improved grip bit having particular utility in engaging and pushing a tube blank through a die or other metal working device. Other objects of the invention include the provision of an improved arrangement for actuating a push pointer and the grip bits mounted thereon, and of an improved gripping and drawing assembly having particular, but not exclusive, utility in grasping and applying tension to the ends of tube blanks.

The above and other objects and advantages of the invention will become apparent upon consideration of the following detailed specification and the accompanying drawing wherein there is specifically disclosed certain preferred embodiments of the invention.

In the drawing, reference numeral 10 indicates, throughout all the views, a die, which in accordance with usual practice, is retained in a head block 11 fixed with respect to the frame of the apparatus. The present invention, in its method aspects, contemplates the use of a push-pointer in conjunction with the die 10 or other metal working device employed and throughout all the views the grip bits of the push-pointing mechanism is indicated by reference numeral 12. The drawbench grip bit carrying buggy is indicated generally by the reference numeral 13 and, in accordance with usual practice, this device is arranged to travel on a bench or track 14, being moved in outward or drawing direction by a chain 15. The tube blank being processed is shown at 16 and a straight drawing mandrel of uniform cross section is shown at 17.

Referring now to Figures 4 through 10, the improved push-pointing mechanism of the invention consists of a frame 20 which is integral with or rigidly attached to the frame 21 of the drawbench. Slideable mounted in transversely spaced but longitudinally extending guideways 22 formed in the frame 20 is a slide 23 the function of which is to support and move the grippers 12. As shown, the latter are generally wedge-shaped and are slideably mounted for longitudinal movement in a block 24 with their wedge surfaces cooperating with inclined surfaces 25 formed in the block 24. Slide 23 has a pair of laterally spaced but vertically extending guideways 26 adapted to slideably receive laterally extending flanges on the block 24 whereby the latter may be readily removed from and inserted in the slide 23. By referring to Figure 5 it will be apparent that movement of the grippers 12 away from the die 10 will move the grippers toward each other and to insure positive opening movement of the grippers when the same are moved in a direction toward the die each gripper is provided with grooves 27 (Figures 8 and 10) on its upper and lower faces to fit about ribs 27 provided in the gripper opening through the block 24. As evident from Figure 8, the grooves and ribs are parallel with the above mentioned wedge and inclined surfaces on the grippers and block, respectively.

Secured to and extending rearwardly of the block 24 is a pair of spaced rods 28 on which is slideably mounted a saddle 29. Extending through suitable apertures provided in this saddle are the reduced end portions of the links 30 which are pivotally connected at their enlarged ends to ears 31 formed on the small ends of the grippers. On the opposite or the smaller ends of the link 30 are the compression springs 32 which are interposed between the saddle 29 and the nuts secured to the outer ends of the links. By referring to Figure 5 it will be apparent that upon movement of the saddle 29 to the right the grippers 12 will be moved longitudinally with respect to the block 24 and consequently will be moved apart while movement of the saddle in the opposite direction will further compress springs 32 thereby applying yielding force through these springs to the closing of the bits 12.

To provide for the movement of the slide 23 in either direction and for the opening and closing movement of the bits 12 the following mechanism is provided. Integral with or rigidly secured to the slide 23 is a pair of laterally spaced rams or cylinders 33 and received within these members are the plungers or pistons 34 which are rigidly anchored at their outer ends in supports 35 which are integral with or rigidly connected to the frame 20. Hydraulic fluid under high pressure is furnished the cylinders 33 through piping 36. Secured in or to the frame 20 between and below the supports 35 is a double acting cylinder 37 having a piston therein the rod of which is connected to a collar 38 having a circumferentially extending groove 39 formed therein. Also rigidly connected to the piston rod and extending axially of the collar 38 is a rod 40 slideable received in a bore formed in a boss 41 depending from the slide 23. Rigidly secured to the outer end of rod 40 is a flange or collar 42 so that slideable movement of member 40 with respect to slide 23 is limited in either direction, it being observed that collar 38 will engage the adjacent end of boss 41 upon movement of the piston in cylinder 37 to the right as viewed in Figure 6.

Pivotally mounted on a transversely extending shaft 43 carried by the slide 23 is a pair of levers 44 and 45, each having a rounded end portion received in the groove 39 of collar 38 and a second and opposite rounded end portion received in notches formed in the outer ends of the saddle 29. Thus the saddle 29 will be caused to be moved along the supporting rods 28 by rotation of the levers 44 and 45. It should be observed that the point of support of the saddle, the point of application of force by the levers 44 and 45, and the point of application of force by the links 30 all lie substantially in the same plane so that canting and binding of the parts is avoided. It should also be observed that the open construction of the slide 23 and the notch connection between the saddle and operating levers enables the grip block 24 and its connected parts including the saddle to be readily removed as a unit from the assembly and for this purpose block 24 is provided with spaced pins 46 to which crane hooks may be attached.

Cylinder 37 is arranged to be supplied with hydraulic fluid pressure through conduit 47 for moving the piston toward the die 10 and through conduit 48 for moving the piston in the opposite direction.

Figure 15:
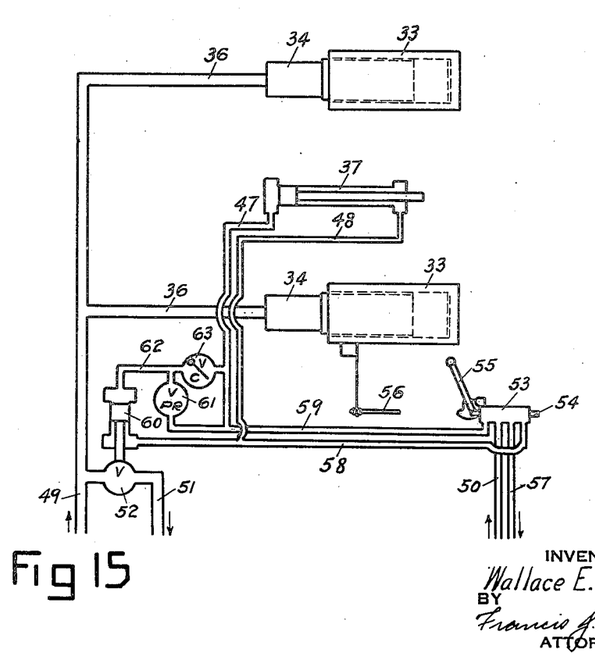
Figure 15 is a schematic showing of a a hydraulic operating and control system for the apparatus of Figures 4 and 5.

Referring now to Figure 15 which shows the hydraulic control system for the push-pointer above described, conduits 36 are supplied from a line 49 leading from a constant volume-variable pressure pump of the "high pressure" variety and hydraulic fluid pressure for control purposes and for actuating the cylinder 37 is supplied from a line 50 leading from a constant volume, constant pressure pump of the "medium pressure" variety. Line 49 is connected with a return conduit 51 through a valve 52 which is normally open so that the high pressure pump normally operates against a negligible head which is a desirable feature in reducing wear of the parts and power consumption. Because of the enormous pressure which such pumps are capable of developing and the harm done to such pump units upon the attainment of extreme pressures the present invention provides for the release of the motivating pressure before the slide on the push-pointer reaches the end of its maximum stroke. By constructing the push-pointer and particularly its hydraulic equipment with capacity in excess of the rated capacity of the drawbench with which it is to be used and insuring that the push-pointer slide will be stopped before it reaches its end of its maximum stroke the high pressure system is protected against damage due to overload.

A four-way valve 53 having an operating plunger 54 is mounted on the push-pointer in position to be actuated either by a hand lever 55 or by an operator 56 secured to the slide 23. Valve 53 is arranged to actuate the cylinder 37 and valve 52 in sequence in the manner and for the purposes now to be described. Valve 53, in addition to having an inlet port connected with line 50, has an outlet port connected with a return line 57 as well as ports connected with conduits 58 and 59. Conduit 58 is connected to conduit 48 and also to the valve end of a servo-motor 60 employed for operating valve 52. Conduit 59 is connected with conduit 47 and also to the inlet port of a pressure regulating valve 61 the outlet of which is connected to a line 62 leading to the opposite end of cylinder 60. Interposed between conduits 62 and 47 is a check valve 63 which prevents flow of fluid from conduit 47 to conduit 62 while allowing the flow in the opposite direction.

In operation, with lever 55 and plunger 54 positioned as shown in Figure 15, pressure from conduit 50 is admitted to lines 58 and 48 holding the piston in cylinder 37 in retracted position and also to the valve end of cylinder 60 thereby holding valve 52 opened. At this time conduit 59 is connected to return conduit 57 which allows any excess fluid in the upper end of cylinder 60 to escape through check valve 63. By referring to Figure 6 it will be observed that piston in cylinder 37 is in retracted position, the slide 23 is retracted and the grip bits 12 are opened. In this condition of the parts the apparatus is ready to receive the blank to be push-pointed and the same is, with or without an internal mandrel, moved longitudinally through the opened bits and lodged against the die 10. The lever 55 is now moved to the right which actuates valve 53 to connect conduit 58 with return conduit 57 and connects conduit 50 with conduit 59. The piston in cylinder 37 now moves forward and through collar 38 rotates levers 44 and 45 about pivot 43. This action slides saddle 29 along rods 28 and through springs 32 and links 30 the grip bits 12 are moved rearwardly and brought into tight engagement with the outer surface of the blank. Collar 38 during this time moves into engagement with the boss 41 of the slide 23 and the slide may begin to move but as resistance to such movement develops pressure builds up in conduit 59 and fluid then flows through valve 61 to the outer end of cylinder 60. Valve 52 is thereupon closed and the high pressure from conduit 49 is caused to flow into cylinders 33 to furnish the large force required to move the slide 23 to push the end portion of the blank through the die 10. As the push-pointing proceeds the operator 56, which is adjustable, engages the plunger 54 thereby reversing the valve 53. This action immediately reverses motor 60 to open valve 52, allowing the pressure in line 49 to be diverted to return 51. The piston in cylinder 37 begins to retract and force the levers 44 and 45 to move saddle 29 and open the grip bits. After the bits are opened, the collar 42 on rod 40 engages the end of boss 41 and the slide 23 now begins to retract. It should be observed that the bits 12 are opened before the slide begins to retract so that the damage done to the blank by the teeth of the bits is kept to a minimum.

Figure 8:
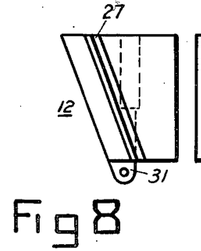
Figures 8, 9 and 10 are plan, section, and end views, respectively, of the improved push-pointer grip bit of the invention.
Figure 9:
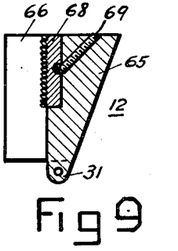
Figure 10:
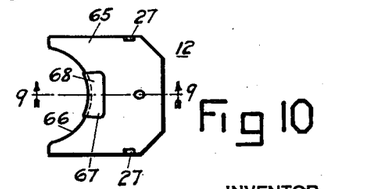

Referring now to Figures 8, 9 and 10, the improved push-pointer grips bits of the invention each comprises a wedge-shaped block 65 having a substantially semi-cylindrical surface 66 adapted to fit about the tube blank to be push-pointed. Centrally of the surface 66 a dovetail slot 67 is milled out and in this slot is secured a bit 68 having a curved serrated gripping face generally complementary to but projecting slightly from the curved surface 66. A screw 69 retains the bit 68 in the slot 67. The radius of surface 66 and the curved serrated surface of bit 68 is dimensioned according to the outside diameter of the tube blank to be handled and the grippers, being readily interengageable, are made in sets to handle different diametered tube blanks. In operation, the serrations of the bit 68 dig into the sides of the blank to bring the cylindrical surfaces 66 into tight engagement with the blank and since the length of contact is substantially the whole circumference of the blank the blank will be prevented from collapsing by the inward thrusts exerted by the grippers. It should also be observed that since the serrations of the grippers move directly into (normal to) the stock as distinguished from a slicing action which would occur if the serrations were continued throughout the circumferential extent of the surfaces 66 the marring of the stock is kept to a minimum.

Figure 11:
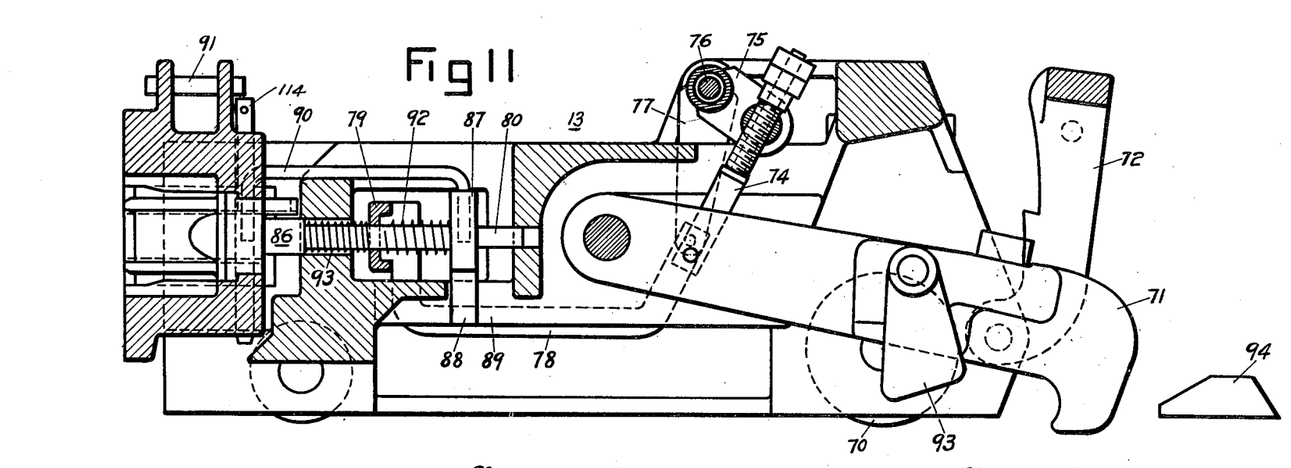
Figure 11 is a longitudinal section through the improved grip bit carrying drawbench buggy of the invention.
Figure 12:
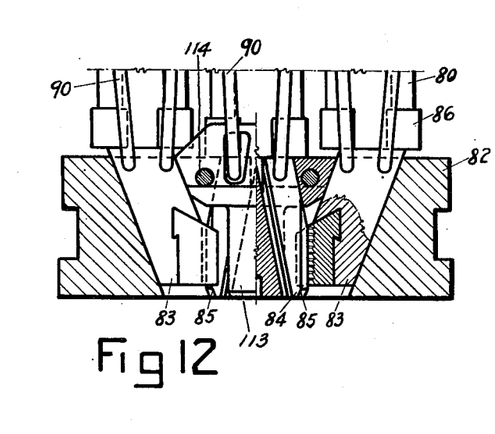
Figures 12 and 13 are plan views, partly in section, of certain possible grip bit arrangements which may be employed in the apparatus of Figure 11.
Figure 14:
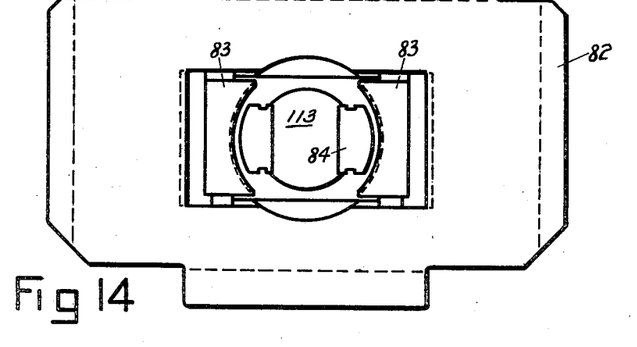
Figure 14 is an end view of a buggy grip bit arrangement.

In accordance with usual practice, the draw carriage of the apparatus of the invention includes a frame or housing supported on wheels 70 which travel along the tracks 14 and pivotally mounted on this frame is a draw hook 71. A latch 72 arranged to be released by a trip rod 73 retains the hook in upper raised position free of the chain 15 and coupled with the hook through adjustable link 74, lever 75, shaft 76, levers 77, and links 78 is a bar 79 extending transversely of the frame of the carriage and arranged to be moved longitudinally of the carriage upon movement of the hook 71 as will be readily apparent from Figure 11. Bar 79 has a plurality of spaced apertures through which slideably extend plungers 80 which are suitably supported and guided for longitudinal movement in the frame or housing of the carriage. Adjacent the outer ends of the plungers 80 the frame of the carriage is provided with vertical guideways 81 adapted to slideably receive an interfitting grip bit carrying block 82. This block which is shown more in detail in Figures 12 and 14 is provided with an opening to slideably receive the grip bit assembly of the apparatus and the particular assembly illustrated in Figures 12 and 14 comprises a pair of grippers 83 to engage the outer surface of the tube end and a pair of bars 84 which are adapted to engage the inner surface of the tube end. For convenience, the bars 84 will hereinafter be termed mandrel bars since it should be apparent upon an inspection of Figures 11 and 12 that as the same are moved outwardly by two of the plungers 80 their tube engaging surfaces will move apart thus providing an expansible mandrel to provide a backing or opposition to the inward forces exerted by the grippers 83 which are moved toward each other upon outward movement of certain of the other of the plungers 80. As shown, mandrel bars 84 are rounded or eased at 85 to assist the entry of the mandrel into the projecting end of the tube.

The ends of the plungers 80 engaging the grip bits and/or the mandrel bars slideably mounted in the block 82 are enlarged at 86 and on the opposite side of the transverse header bar 79 collars 87 are mounted on the plungers 80, these collars being provided with depending portions 88 slideably mounted in guideways 89 to prevent rotation of the collars. Each of the collars 87 is provided with a vertical bore and likewise the plunger end of each of the grip bits and mandrel bars. Interconnecting the bores in the bits and/or bars with the bores in the collars 87 are the links 90 of which there is one for each plunger. Links 90 are readily removed vertically and upon their removal the entire gripping assembly mounted in and including the block 82 may be lifted out of the carriage frame and for this purpose the block 82 is provided with spaced crane hook engaging pins 91. It should be observed that the trip rod 73 is out of the path of travel of the block 82 when the same is lifted out of the frame and, further, that no part of the mechanism, other than the removal of links 90, need be disassembled to remove or interchange the gripping assembly.

Figure 13:
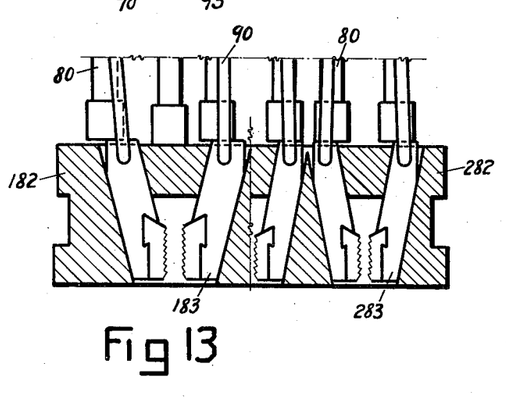

Figure 13 is a composite view illustrating the manner in which the number and arrangement of the grippers in the grip block may be varied. In the left part of the figure is shown one half of a block 182 which is arranged to receive two pairs of grip bits 183. The right half of the figure shows one half of a block 282 mounting three pairs of grip bits 283. It will be understood that when assembly 182—183 is employed and a suitable die block mounting two dies substituted for block 11 and a grip block mounting two pairs of grippers substituted for the block 24 the drawing machine will be set up for drawing two blanks simultaneously. By a similar change in set-up assembly 282—283 may be employed to draw three blanks simultaneously. In assembly 182—183 mandrel bars similar to bars 84 may be mounted, if desired, between each pair of bits 183 and the second and fifth plunger of the carriage used as the operators therefor. In assembly 282—283, as well as in the other arrangements, the same plungers used for the grip bits may be employed for the mandrel bars although, by suitable modification, additional operating plungers may be provided.

In the operation of the draw carriage the hook 71 is raised as the carriage moves toward the die or dies so that through springs 92 mounted on plungers 80 intermediate bar 79 and collars 87 the bar 79, being moved toward the hook, will move the collars 87 and through the links 90 the bits and/or mandrel bars to retracted position whereby the end of the blank may be received between the bits. Trip rod 73 by engaging the head block of the machine releases hook 71 which drops into chain 15 and upon dropping moves bar 79 away from the hook to compress springs 93 interposed between plunger ends 86 and the bar thereby moving the bits 83 to closing position and the bars 84 to expanded position to thereby tightly grip the end of the blank. As the gripping is effected and tension builds up the hook is raised sufficiently, by reason of the elevation of the hook pivot, to allow latch 72 to be locked in. If the start is false the hook does not raise and a projection 93 eventually reaches a cam 94 mounted on the bench and lifts the hook out of the chain and to release or open the gripping mechanism. The hook is again latched in raised position and, of course, this action retracts bars 84 into position preparatory to again entering the end of the tube blank. Upon completion of a draw and the sudden release of tension in the tube the tube and carriage jump forward, disengaging the hook from the chain, and momentarily releasing the tightness of the bits and mandrel bars enabling the previously compressed springs 92 to act through the collars 87 and links 90 to move the bits and bars to retracted position whereby the carriage is disengaged from the tube. The invention thus provides a backing mandrel to engage the interior of a tube wall opposite the gripping bits which is mounted on the carriage, is expansible, and entirely automatic in its operation in engaging and disengaging the tube.

Referring back to Figures 6 and 7, inasmuch as the saddle or crosshead 29 and its support and connections with the grip bits are all removable along with the block 24, the block may be quickly interchanged with other blocks carrying bits of a different size or two or three pairs of bits, depending on the size of stock to be handled and whether the machine is to be set up for single, double or triple drawing. The crossheads or saddles (29) on the respective assemblies will each have sockets or slots fitting over the upper ends of the levers 44 and 45.

Figure 1A:
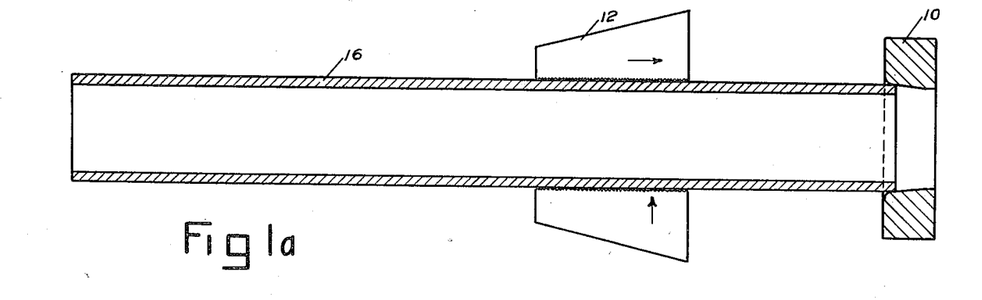
Figures 1a and 1b are schematic views of the essential parts of apparatus which may be utilized in carrying out a method of the invention, the views showing a tube blank about to be push-pointed and about to be drawn, respectively.
Figure 1B:
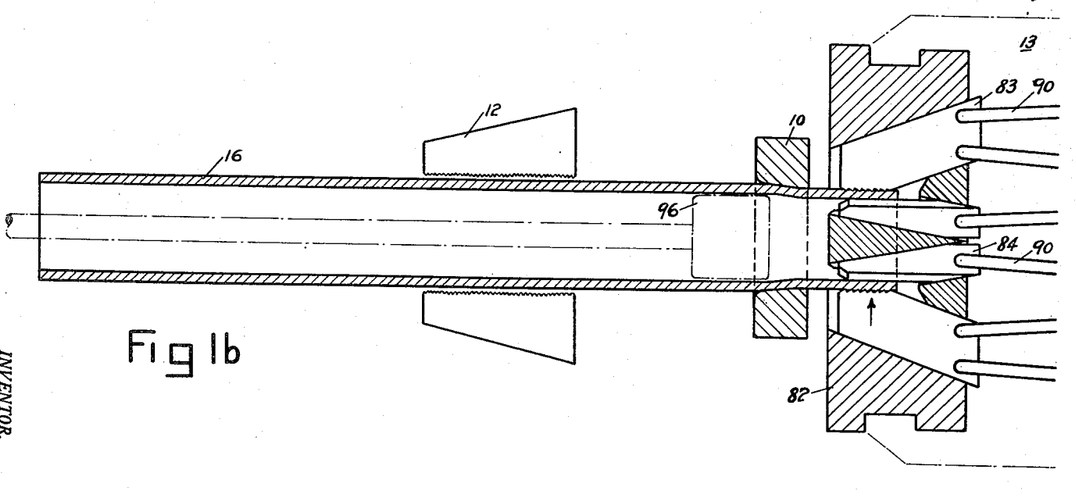

One representative use of the complete apparatus including the push-pointer, die and draw carriage is illustrated in Figures 1a and 1b. As shown, the tube blank 16 is of substantially uniform cross section throughout its length and in Figure 1a is shown as about to be pushed through the die by the push-pointer grips 12. By reason of the semi-cylindrical nature of the grips 12 the blank will not collapse and sufficient force can be applied to move the end portion of the blank through the die. The extruded portion need only be sufficient to enable the grips 83 and bars 84 to take hold and in Figure 1b the draw carriage 13 is shown as having hold of the tube end preparatory to the completion of the drawing operation. The method of Figure 1 may be employed either for sinking, i. e. reducing the outside diameter of the tube without reducing the thickness of the side walls, but if side wall thickness is to be controlled or reduced a plug mandrel 96 may be employed as will be understood. While a short end portion of the tube will not be reduced in side wall thickness the loss is small and the tube is left with a large opening which facilitates pickling and lubricating preparatory to succeeding drawing operations if employed.

Figures 2A, 2B, 2C:
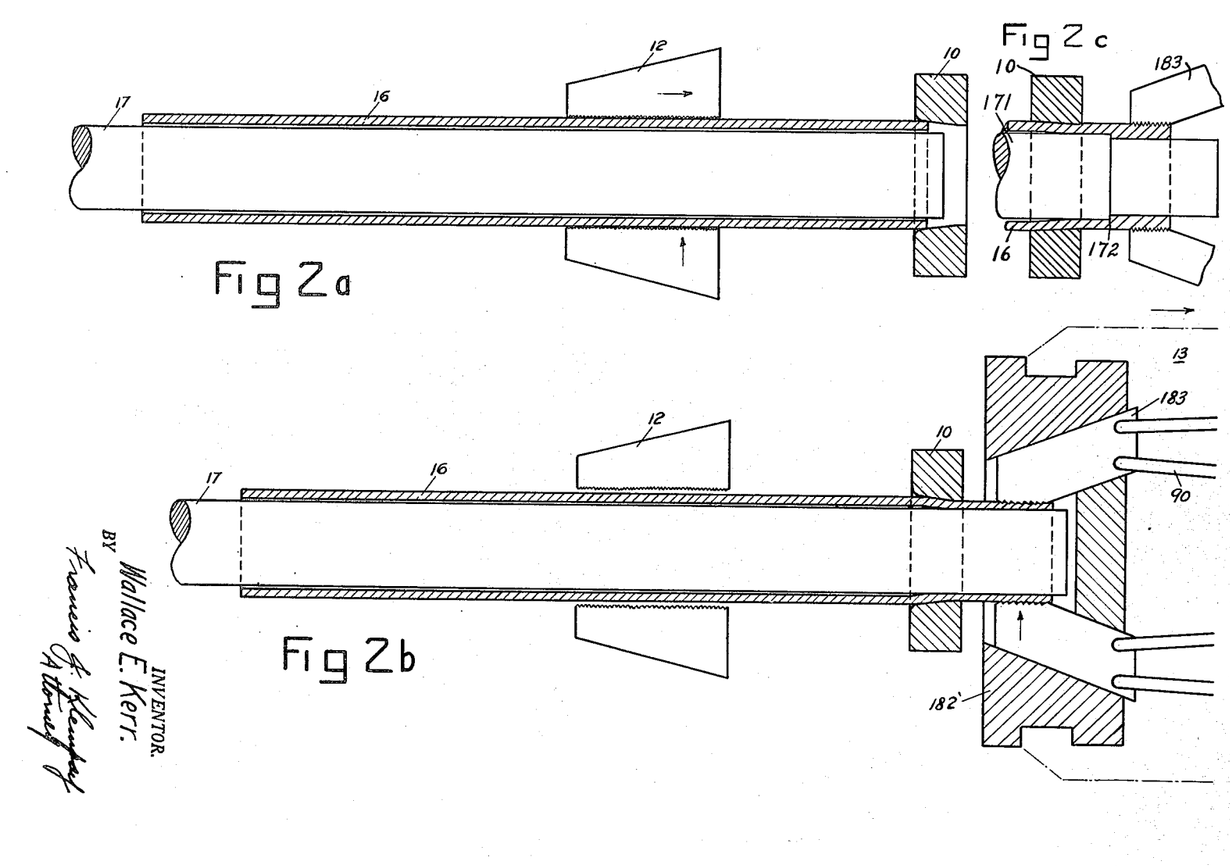
Figures 2a and 2b are schematic representations of an alternate method of initiating the drawing of the tube blank, the views showing the tube end about to be extruded and the tube about to be drawn, respectively.
Figure 2c is a fragmentary section illustrating the modification of the method of Figures 2a and 2b wherein the leading end of the tube blank is lipped over a shoulder formed on the mandrel.

Figures 2a and 2b illustrate the invention as employed in the drawing of tubes on a long mandrel and in this modification a draw grip assembly generally similar to the assembly 182—183 but employing only a single pair of grips is employed. As explained above the entire length of the tube blank is worked or reduced and the only imperfection in the drawn tube are the marks made by the serrations on the grips 183'. These marks are ground off before the next succeeding drawing operation to avoid injury to the die in the succeeding draw. It will be observed that if upon completion of all the drawing operations and the subsequent grinding and polishing of the marks made by the grip cropping is still necessary the scrap loss will be very small since the grips cover only a few inches of the end of the tube.

In Figure 2c I have illustrated a slight modification of the method illustrated by Figures 2a and 2b. In this modification a mandrel 171 having a shoulder 172 is employed and it should be apparent that at the start of an operation the first thing accomplished is the sinking down of the leading end portion of the tube 16 onto the reduced portion of the mandrel 171. While this is accomplished primarily by the pushing grips it will be understood that if the reduced portion of the mandrel is long enough to be engaged by the grips on the draw carriage the latter may also be employed. To complete the draw the grips (183) of the drawing carriage may engage either the reduced end portion of the mandrel or the end portion of the tube blank as illustrated in Figure 2c.

Figure 3A:
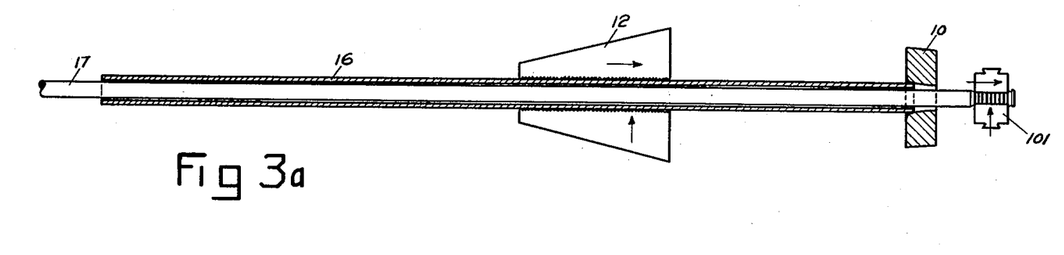
Figures 3a and 3b are schematic showings of a further modification in which the long mandrel employed is pulled by a separate and retractible pulling device to assist in the reducing of the end portion of the tube blank.
Figure 3B:
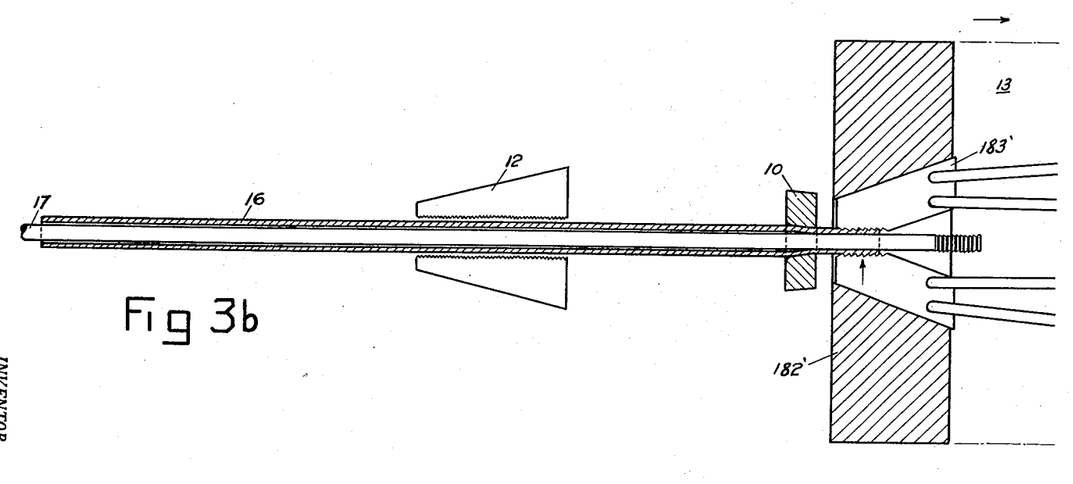
Figure 4:
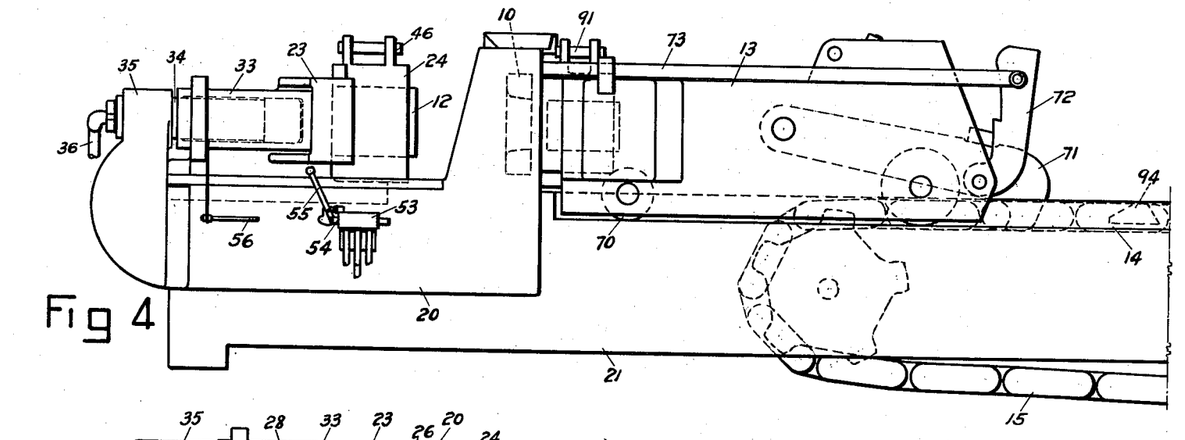
Figures 4 and 5 are side elevation and plan views, respectively, of apparatus which may be employed in carrying out the method of Figures 1a and 1b.
Figure 5:
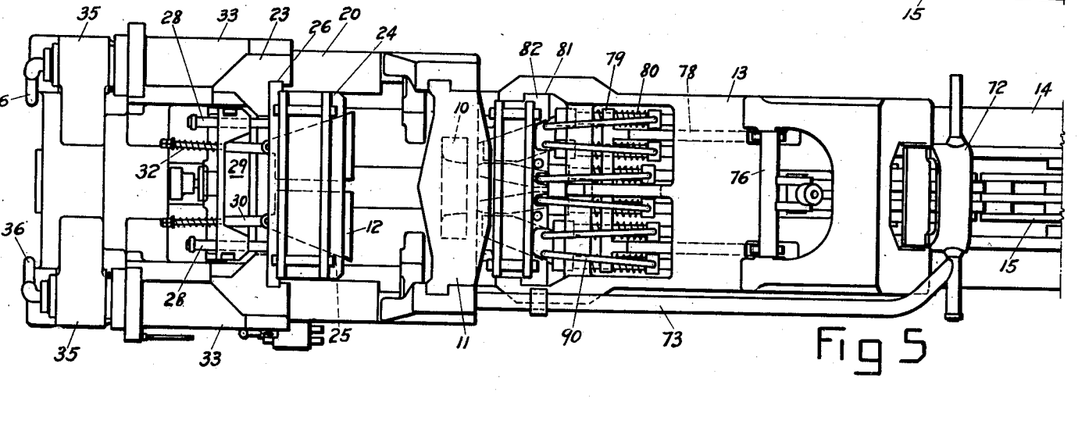
Figure 6:
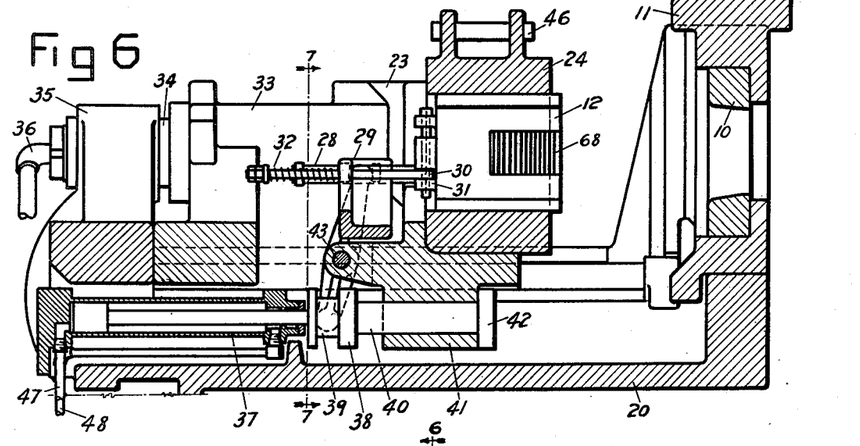
Figure 6 is a longitudinal section through a portion of the apparatus of Figures 4 and 5.
Figure 7:
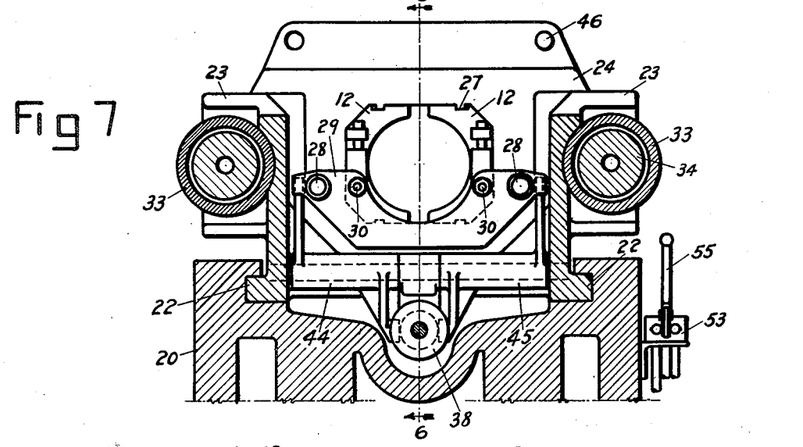
Figure 7 is a transverse section through the apparatus of Figure 6.

Figures 3a and 3b illustrates a method generally similar to that of Figures 2a and 2b but includes the additional step of applying, at the start of the drawing operation, a pulling force to the mandrel 17 to assist in the starting of the tube blank through the die. As the blank end enters the die the blank is swaged into tight engagement with the mandrel and the very substantial friction created between the blank and mandrel results in the application of a heavy pulling force to the end of the blank. This additional pulling force is preferably applied by an additional element in the assembly since the push-pointer moving means cannot advantageously be utilized because of the difference in the rate of movement of the blank and mandrel while the necessity of correlating the drawing operation with movement of the grips 12 of the push-pointer precludes the use of the draw carriage 13. Therefore to provide this initial pulling force I preferably employ a separate carriage 100 mounting a pair of grippers 101 and a force applying cylinder 105 and which may be readily moved out of the way along the laterally extending tracks or guides 103.

Figures 16, 18:
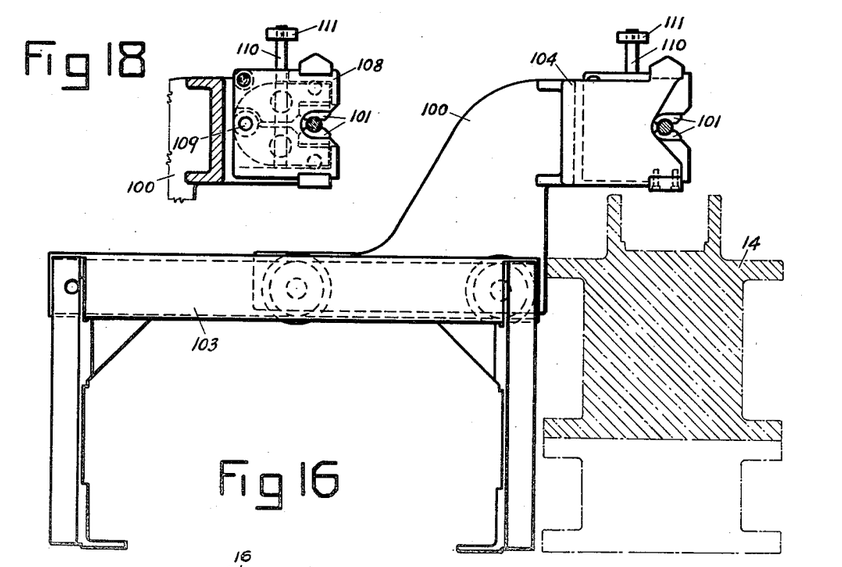
Figures 16 and 17 are rear and side elevations, respectively, of a pulling mechanism employed in the method illustrated in Figures 3a and 3b.
Figure 18 is a detailed view showing the grip closing mechanism of the apparatus of Figures 16 and 17.
Figure 17:
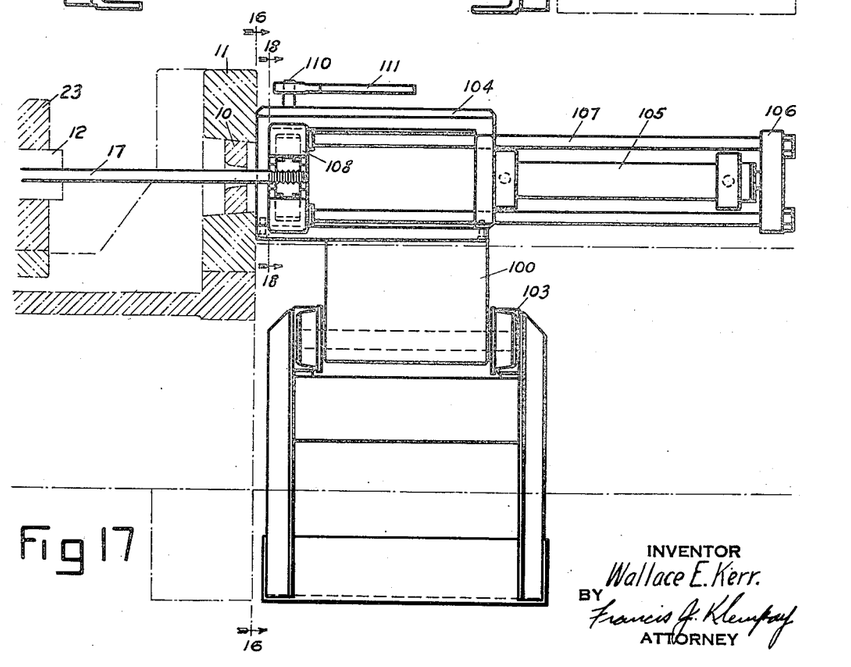

Referring now to Figures 16, 17 and 18 which shows the pulling mechanism more in detail it will be observed that the carriage 100 mounts a box-like frame 104 adapted to abut against the bench face of the die block 11 when in operative position and secured to and extending outwardly of the end of frame 104 which is opposite the end engaging block 11 is a hydraulic cylinder 105 the piston rod of which is connected to a crosshead 106. Extending rearwardly of the crosshead 106 are the spaced pull rods 107 connected at their rear ends to a block 108 mounting the grippers 101. The latter are pivoted together at 109 and a screw 110 having an operating handle 111 is employed to clamp the grips 101 onto the end portion of the mandrel 17. In operation, with the grips 101 retracted, carriage 100 is moved to push frame 104 in front of the block 11 in which position the grips 101 will encompass the end portion of mandrel 17 which end portion may be reduced and serrated as shown. Screw 110 is tightened by handle 111 and hydraulic fluid pressure is thereafter admitted to cylinder 105 preferably by a valve under the control of the servomotor 60 so that both the push-pointer and the pulling grips 101 will operate in unison. The speed control for cylinder 105 is made adjustable to conform to the elongation of the tube being drawn by means of a fluid system delivering a measured volume of fluid as will be understood.

Upon the grippers 101 being clamped onto the mandrel 17 and fluid pressure being admitted to cylinder 105 the frame 104 will be placed under compression while tension will appear in rods 107 thereby tightening frame 104 against block 11 and applying a pulling force to the mandrel 17. The action of this force in conjunction with the pushing force exerted by the push-pointer will draw the blank and mandrel through the die a distance determined by the length of stroke of the push-pointer. Reversal of valve 53 relieves the pressure in cylinder 105 and upon release of the grippers 101 the carriage 100 is retracted enabling the draw carriage 13 to engage the extruded end of the tube 16 as shown in Figure 3b after which the drawing operation is continued in the normal manner. A manual control, not shown, is preferably employed to admit fluid to the opposite end of cylinder 105 to retract the grip housing 108.

Referring back to Figures 11, 12, and 14, which illustrate the expansible mandrel of the draw carriage, the bars 84 are preferably slideably received in a block 113 which is removably retained in the block 82. Block 113 is an integral member having openings to slidably receive the bars 84 and, as shown, bars 84 are provided with longitudinal grooves fitting tongues on the block 113 to further guide the movement of the bars. Block 113 is retained in position in the block 82 by means of the pins 114.

It should be understood that the apparatus and methods of the invention are equally applicable when using shouldered mandrels in the tube drawing. In this case the end portion of the blank is sunk down onto the reduced end portion of the mandrel by the push-pointer and the drawing is accomplished by the draw carriage engaging the sunk portion of the tube or the reduced end of the mandrel. In case the draw carriage is to engage the reduced end of the mandrel a ferrule may, if desired, be first placed over the sunk portion of the tube to positively prevent the mandrel from being pulled out of the tube or blank as will be understood. As in the methods described in connection with Figures 1a and 1b the side wall of the end portion of the tube cannot be reduced by this mode of operation but here again the scrap loss is reduced and a large opening is left in the tube to facilitate subsequent processing.

The above specifically described methods and means, particularly the specific apparatus disclosed, should be considered as illustrative only since many changes may be made therein without departing from the spirit or scope of the invention. Reference should therefore be had to the appended claims in determining the scope of the invention.

What I claim is:

1. Push-pointing apparatus comprising in combination a base, a support slideably mounted on said base, a stock gripping device on said support, a member mounted on said support and movable relative thereto to move said device in opening and closing direction, means to move said support in push-pointing direction, and separate means to move said support in either direction, said last mentioned means being connected to said member whereby said device is closed onto the stock upon initiation of forward movement of said support and opened upon initiation of retracting movement of said support.

2. Push-pointing apparatus comprising in combination a base, a support slideably mounted on said base, a stock gripping device on said support, means to initiate movement of said support in push-pointing direction and to exert a continuing force in such direction, a primary means for exerting push-pointing force to said support, and means operable upon said initiating means exerting a predetermined force to actuate said primary means.

3. Push-pointing apparatus comprising in combination a base, a support slideably mounted on said base, a stock gripping device on said support, an operating link for said device on said support, means to move said support having a movable element connected to said link and having a lost motion connection with said support whereby said device is actuated before said support is moved.

4. Push-pointing apparatus comprising in combination a base, a support slideably mounted on said base, a stock gripping device on said support having an operating link also carried on said support, a cylinder on said base parallel with the direction of movement of said support, a piston in said cylinder having a rod connected to said link, and a lost-motion connection between said rod and said support whereby actuation of said device precedes movement of said support.

5. Push-pointing apparatus comprising in combination a base, a support slidably mounted on said base, a stock gripping device on said support, fluid pressure means for moving the support in push-pointing direction, a second fluid pressure means for actuating said device, and rigid fluid conductors for conveying fluid pressure to said second fluid pressure means, said second fluid pressure means anchored to said base and extending in a direction to augment the first mentioned fluid pressure means when the support is moved in push-pointing direction.

6. Push-pointing apparatus comprising a base, a support slidably mounted thereon, a stock gripping device mounted on said support, an operating member movably mounted on said support and connected with said device to actuate said device in either an opening or a closing direction, power means to move said support in a push-pointing direction, and other power means interconnected between said base and said operating member on said support and effective upon actuation to first move said operating member relative to said support to open said gripping device and to thereafter move said support in the opposite direction.

7. Push-pointing apparatus comprising a base, a support movably mounted on said base, a stock gripping device movably mounted on said support, abutment means on said support to limit the extent of movement of said stock gripping device with respect to said support, a motion transmitting member movably mounted on said support and connected with said stop gripping device for actuating the same, a fluid-pressure-operated motor having a fixed part mounted on said base and a movable part connected with said motion-transmitting member, and rigid immovable fluid conductors for conveying fluid pressure to said motor.

WALLACE E. KERR.

REFERENCES CITED

The following references are of record in the file of this patent:

UNITED STATES PATENTS

| Number | Name | Date |
| --- | --- | --- |
| 291,282 | Blue | Jan. 1, 1884 |
| 441,927 | Bray | Dec. 2, 1890 |
| 519,086 | Larson | May 1, 1894 |
| 524,504 | Robertson | Aug. 14, 1894 |

(Other references on following page)

UNITED STATES PATENTS

| Number | Name | Date |
|---|---|---|
| 600,012 | McCool | Mar. 1, 1898 |
| 600,013 | McCool | Mar. 1, 1898 |
| 678,753 | McCool | July 16, 1901 |
| 701,926 | Oberjohann | June 10, 1902 |
| 977,135 | Shuster | Nov. 29, 1910 |
| 1,025,568 | Higgins | May 7, 1912 |
| 1,711,825 | Barnhart | May 7, 1929 |
| 1,812,359 | Moltrup | June 30, 1931 |
| 1,904,947 | Leech | Apr. 18, 1933 |
| 1,982,544 | Singer | Nov. 27, 1934 |
| 2,110,965 | Singer | Mar. 15, 1938 |
| 2,264,688 | Wolf | Dec. 2, 1941 |
| 2,320,739 | Knudsen | June 1, 1943 |
| 2,335,939 | Hill | Dec. 7, 1943 |
| 2,359,167 | Somes | Sept. 26, 1944 |
| 2,404,234 | Kerr | July 16, 1946 |

FOREIGN PATENTS

| Number | Country | Date |
|---|---|---|
| 1,914 | Austria | Aug. 10, 1900 |
| 5,752 | Great Britain | Mar. 8, 1902 |
| 115,536 | Germany | Dec. 12, 1900 |
| 451,480 | Great Britain | Aug. 6, 1936 |